H. L. DOHERTY.
METHOD OF MAKING COMBUSTIBLE GAS.
APPLICATION FILED JAN. 29, 1915.
1,207,724.
Patented Dec. 12, 1916.
2 SHEETS—SHEET 1.
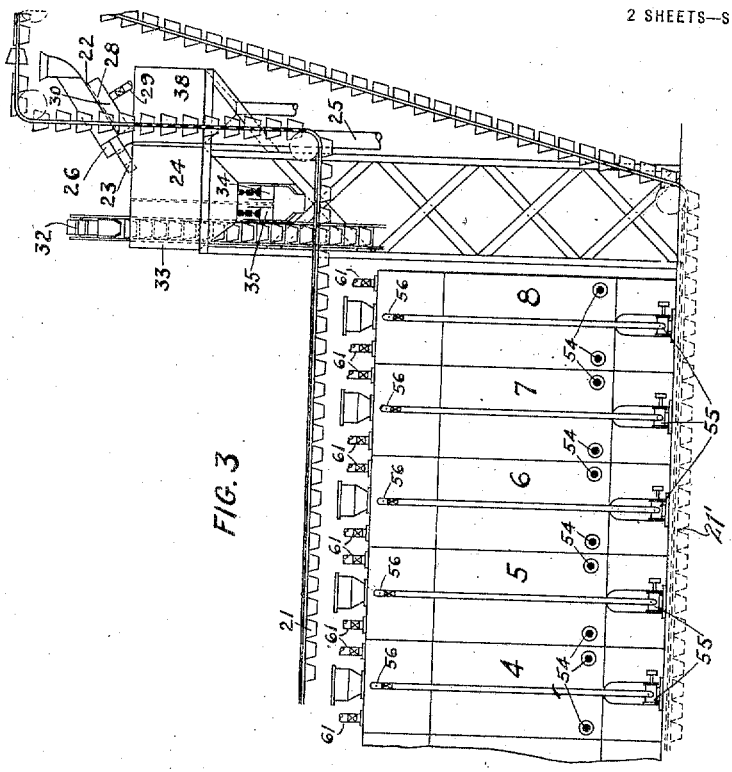
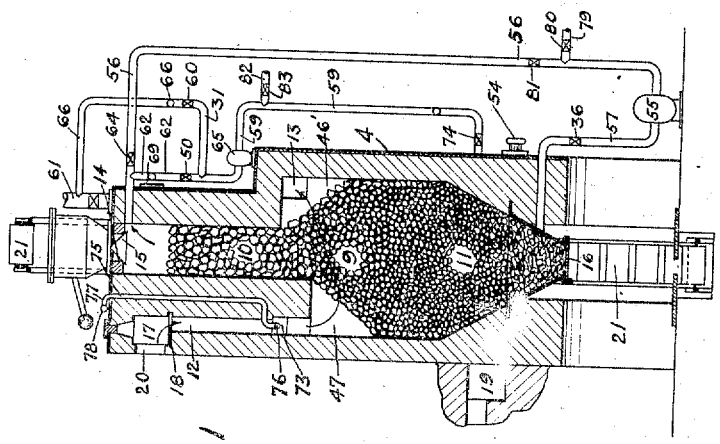
Witnesses:
Henry L. Doherty Inventor
By his Attorney Frank S. Young

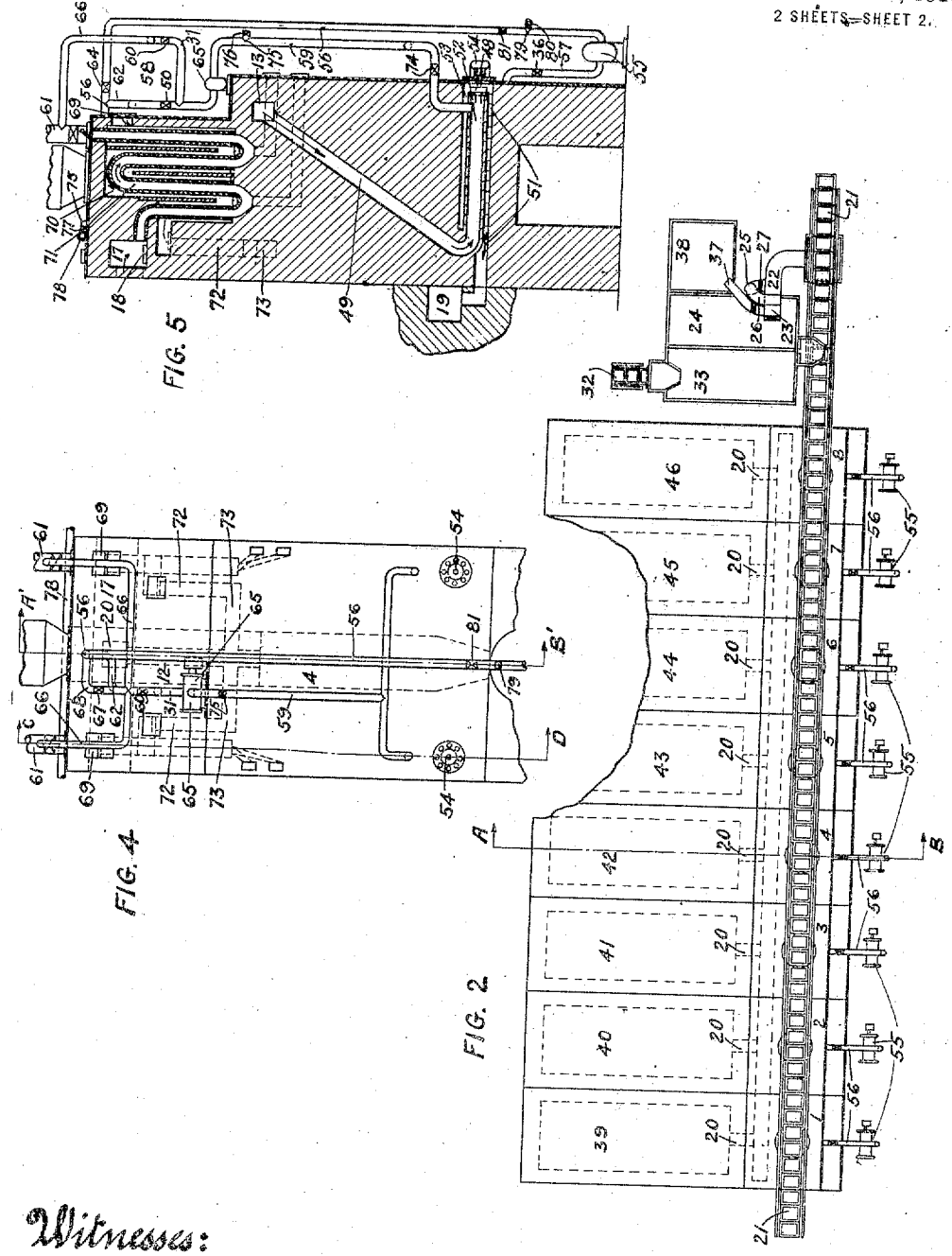

UNITED STATES PATENT OFFICE.

HENRY L. DOHERTY, OF NEW YORK, N. Y.

METHOD OF MAKING COMBUSTIBLE GAS.

1,207,724.　　　　Specification of Letters Patent.　　Patented Dec. 12, 1916.

Original application filed November 15, 1911, Serial No. 660,449. Divided and this application filed January 29, 1915. Serial No. 5,111.

*To all whom it may concern:*

Be it known that I, HENRY L. DOHERTY, a citizen of the United States, and a resident of New York city, in the county of New York and State of New York, have invented certain new and useful Improvements in Methods of Making Combustible Gas, of which the following is a specification.

This invention relates to methods of making combustible gas.

The objects of my invention are to maintain the entire fuel bed of a gas generator in an open condition, comparatively free from ashes, and, therefore, easily permeable by the blast, even when the generator or producer is running on bituminous fuel, and to restore to the combustion region of the generator the heat carried out of the same by the fuel mass that has passed therethrough, by circulating a portion of the gas generated in contact with the said fuel mass and returning the said gas to the said combustion region.

This application is a division of my application Ser. No. 660,449, filed Nov. 15th, 1911, and relates to a specific modification of the invention claimed in said application in which the combustion in the generator is supported by an oxidizing draft current comprising regulated proportions of endothermic fluid and air—the endothermic fluid in this modification of my invention being either steam alone, or a mixture of steam and flue gas.

In my application Ser. No. 660,453, filed of even date with above mentioned application, I have disclosed and claimed the broad method of conducting combustion of which the herein claimed invention is a specific modification, adapted to the manufacture of combustible gas. The method of recuperating the heat of the material discharged from the combustion region, herein-disclosed is a specific case under the broad method of recuperating the heat of hot solid material of which another specific application is disclosed in my application for Letters Patent Ser. No. 535841, filed Dec. 31st, 1909. In this latter modification of heat recuperation adapted to be used with materials which will permit of the use of a gaseous heat-carrying medium of an oxidizing nature, I make use of air as the medium for the transfer of heat. In the modification of the method of returning to the combustion region heat carried out of the same by the material which has passed therethrough, which I use in the process herein claimed, the return of said heat is effected by the return to the combustion region of a portion of the gas generated.

In the accompanying drawings I have shown, in more or less diagrammatic form, a battery of gas producers and appurtenances suitable for applying my invention.

Figure 1 is a vertical diametral section through one gas producer on the line A—B of Fig. 2 and line A'—B' of Fig. 4. Fig. 2 is a diagrammatic plan of the apparatus showing the arrangement of the conduits, blowers, fuel elevators, etc. Fig. 3 is a partial front elevation of the apparatus. Fig. 4 is a front elevation of a single producer on an enlarged scale showing the position of the gas flues, etc. Fig. 5 is a vertical section through one of the recuperators of a producer on the line C—D of Fig. 4 showing the construction of the recuperators and heat interchangers.

Briefly stated, my invention comprises a method of operating a gas producer in which fuel from the mass in the producer is maintained in circulation (either intermittent or continuous) through the fuel chamber, the fuel being withdrawn at the bottom of the chamber, screened, and returned to the producer at the top. The fuel, prior to being withdrawn at the bottom of the producer, is cooled advantageously by a current of gas from the carbonizing region which has been drawn up through the fresh fuel being supplied to the producer, the said fresh fuel being thus, at the same time, heated and the gas cooled.

My invention comprises also various other features which will be described below.

The apparatus shown comprises a battery of gas producers, numbered 1, 2, 3, 4, 5, 6, 7 and 8, respectively. Referring to the producer 4, which is shown in vertical cross-section in Fig. 1, 9 is the gasifying chamber, 10 the preheating chamber and 11 the cooling chamber. As shown, the producer is constructed to operate with lateral draft, the inlet 12 for the primary current being located on one side of the producer in the gasifying chamber while the offtake 13 for the producer gas is located on the opposite side of the gasifying chamber, thus giving the gas producing current a flow across the producer.

14 is the charging opening at the top of the preheating chamber 10, closed by the cone 15.

16 is the discharging door at the bottom of the cooling chamber.

17 is the main flue for carrying the primary draft current and which distributes the primary draft to the several producers in quantity controlled by the dampers 18.

19 is the principal producer gas flue into which all the producers discharge.

20, 20, etc., are flues connecting 17 with source of combustion gases (the stack flues of steam boilers in the present case).

21 is a conveyer of any approved type which runs the length of the battery of producers and is so located that in its lower or return portion 21' it will readily pick up the fuel mass discharged from the producers, transport it to the screening apparatus 22, and will transport the screened fuel, together with a portion of fresh fuel, to the charging hoppers of the producers. It is to be noted, however, that the particular fuel conveying means shown, though advantageous, is not essential to my invention, and many other types of conveyers may be substituted for the one shown.

23 is the chute for the screened material which discharges into the storage bin 24.

25 is the ash chute, which has branches 26 and 27, the former being the fine ash chute and the latter the coarse ash chute carrying off the coarse particles which pass through the screen or grizzly 28.

29 is a pipe carrying air under a slight pressure and discharging it into the air box beneath the screen or grizzly 28. This causes a strong current to discharge through the stream of coal passing over 28. The attrition between the particles and fragments of the mass tends to disintegrate the ash fragments into a more or less fine powder which is taken up by the air current and diverted into the chute 26. Ash particles too coarse to be taken up by the air, but small enough to pass through the interstices of 28, discharge through the chute 27. The ash may, of course, be directly discharged into cars and immediately removed or carried away by some form of conveyer to the dump.

The coarser portion of the fuel discharges through the chute 23 into the bin 24. The raw coal is raised by the elevator 32 and discharged into the bin 33. By manipulating the gates 34 and 35 of 24 and 33, respectively, coked and raw fuel is discharged into the conveyer 21 which carries it along the tops of the producers and from which the fuel mixture is discharged into the preheating chambers of the producers as required. The chute 23 is so arranged that the screened fuel withdrawn from the producer may, when the bin 24 is full, be diverted through the chute 37 into the coke pockets 38.

It is obvious that the producers may be operated to produce coke as well as gas when desired. This method of operation may be desirable when it is desired to produce a fairly rich gas comparatively high in illuminants. In this case, sufficient bituminous coal is charged to give the desired volume of rich gas, the surplus coke produced being run to the pockets 38 or dumped on the ground to be removed as desired.

All or a portion of the relatively rich gas, consisting of a mixture of the producer gas drawn from the chamber 9 and the distillation gases of the bituminous coal resulting from the carbonization of the bituminous coal by the hot producer gas in the preheating chamber 10, which is taken off from 10 through the off-take 56, is drawn from 56 by the blower 65 through the connection 62 and forced through the pipe 59 into the inner flue 52 of the heat interchanger 51. Since the gas drawn off through 56 is comparatively cool, it may be used instead of the flue gas from the recuperator stack 61, as explained below, to establish the necessary temperature differential between the two streams of gas in the heat interchanger, when the unaided action of the interchanger is insufficient to establish the desired differential. Valves 64 on 56 and 50 on 62 serve to regulate the portion of the comparatively rich gas which is drawn off of 10 which is sent to flue 52 of the heat interchanger and therefore mixed with the producer gas proper. This manner of operating upon coal in an internally heated shaft or the like to manufacture coke and rich gas I do not claim specifically herein, it forming part of the matter of my co-pending application Ser. No. 660,451, filed Nov. 15th, 1911.

If the superficial area of the flue 52 should be insufficient in any case to maintain a sufficient temperature difference between the gas in 52 and that flowing through 53, the proper differential may be established by admitting to 52 through the pipe 59 either a portion of relatively cool flue gas from the stack 61 of the recuperator 58 or a portion of cold gas from the preheating chamber of the producer, as already explained. If flue gas is to be used to establish the necessary heat differential the valve 50 on the connection 62 is closed and valve 60 on the connection 31 is opened to the necessary extent. The gas will now be drawn by blower 65 through 31 from the pipe 66 which is connected with the stacks 61 of the recuperators, and forced through connection 59 to the flue 52 of the heat interchanger 51.

The admixture of the cold gas with the producer gas in 52 of course diminishes the temperature of the same to a degree corresponding to the proportion of cold gas introduced. When this mixture passed back through the flue 53 it still further reduces the temperature of the gas flowing to the fan owing to the fact that the mixture has a greater heat capacity (approximately proportional to the quantity of cold gas introduced) and for the same transference of heat from 52 to 53 does not change in temperature as much as the smaller volume of gas passing through 52. To establish the desired ultimate temperature differential, therefore, it is not necessary for me to add the proportion of cold gas to the producer gas that would be required to establish such temperature by direct mixture, but a volume considerably less than this. It is obvious that I can not only use either the cool producer gas from 10 or the flue gas from 61 to establish a heat differential in the heat interchanger 51, when necessary, but a mixture of the two in any relative proportions.

The method of handling hot gases by ordinary fans described above I do not claim specifically herein, but will claim it in another application.

The method of operating my apparatus to carry out my process as applied to producer 4 is as follows: A bed of ignited fuel is gradually built up in the producer in the well known manner. To facilitate operations when starting up the producer an air connection, 79, is provided on the suction pipe 56 of blower 55, and valves 80 and 81 on 79 and 56, respectively. By means of these connections the blower 55 may be made to supply a draft current of air alone to the chamber 11 or a mixture of air and flue gas if desired. When the ignited fuel has reached the top of the gasifying chamber the remainder of the fuel required to fill the producer shaft may be rapidly charged. The producer is now in the proper condition for applying my process. Hot flue gas (from the boilers 39, 40, 41, 42, 43, 44, 45 and 46, in this case) flows into the main flue 17, and thence passes through the connections 12 to the gasifying region of the producers in connection with air. The air enters the recuperators through the air dampers 69, thence passes through the air flues 70 in contact with the walls of the flues 71 through which hot flue gas is passing, thence through the air off-takes 72 to the cross-flue 73 and thence into the primary flue 12.

It is to be noted that offsets are made to the gasifying chamber 9 at the front and rear of the chamber, forming, respectively, a gas collecting chamber, 46', and a gas distributing chamber, 47, due to the fuel assuming its natural angle of repose. The primary draft current discharges from the flue 12 into the distributing space 47. Under the action of the fan 48 the primary current is drawn across the fuel column, setting up a semi-combustion of the fuel, which forms producer gas as described in my Letters Patent #829,105 and others. The oxygen of the air and the carbon dioxid of the flue gas react with part of the carbon of the fuel to form carbon monoxid. It is advantageous to use the greatest proportion of flue gas or steam, or a mixture of the two, in the primary current that can be used without unduly reducing the temperature of the fuel bed in the producer. Owing to the fact, however, that the reaction of the carbon dioxid of the flue gas with the fuel in the producer absorbs a large quantity of heat it is necessary, with comparatively low temperature flue gases, to add sufficient air to the primary current to produce enough combustion of the fuel directly with oxygen of the air to generate the heat that is required to maintain the temperature of the fuel bed. The relative proportions of endothermic gas and air in the primary draft are therefore so adjusted that the net heating effect of the draft current on the fuel bed will maintain the latter at the temperature desired. In other words, I burn the fuel in the producer by a draft current of balanced endothermic and exothermic influence on the fuel, the balance of the two actions being so regulated that the temperature of the fuel bed may be maintained at the desired point.

While I do not deem it so advantageous, I may substitute steam for flue gas as the endothermically reacting constituent of the primary draft current (which is the specific modification of my invention herein claimed) either wholly or partially, or I may carry out the essential features of my process using a primary draft of air alone. When using steam instead of or in admixture with flue gas as the endothermic constituent of the draft current, the damper 18 is closed and valve 77 on the steam connection 75 opened to the desired degree. Steam now flows from the steam main 78 through the connection 75 and nozzle 76 into the primary flue of the producer, inducing a flow of combustion gas through 12 in quantity regulated by damper 18. Air at the same time flows to the producer through the same flues as before. By properly regulating the valve 77 the composition of the primary draft current may be regulated to produce the desired effect upon the fuel bed. By entirely closing damper 18, the draft current will, of course, be composed of steam and air alone.

The nitrogen of the primary current and the products of the reactions with the carbon of the fuel form the "producer gas" which collects in the space 46' and is drawn through the flues 13 and 49 to the flue 52 of the heat interchanger 51. This heat interchanger 51 in the arrangement shown consists of an inner flue, 5°, enveloped by an outer flue, 53. The blower 48 is located opposite the front end of the flue 52 in the open space establishing communication between 52 and 53. 48 is driven by the motor 54.

When starting normal operations, the setting being relatively cool, the gas drawn to the fan 48 (which gas generally leaves the producer at about 1200-1400° F.) is cooled down to a temperature which will not injure the fan. This gas passing back through the outer flue 53 serves to cool the portion of gas following it to the fan in its turn. In other words, there is effected an interchange of heat between the gas flowing to the fan and the gas discharging from the fan. By this device I am able to use a fan of the ordinary type to establish the necessary draft through the fuel bed and flues without sacrificing any of the heat of the gas. The reheated gas passes from 53 to the place of use—in this case, the combustion chamber of the boiler coöperating with the producer 4.

In establishing the composition of the primary draft current I aim to use the maximum quantity of flue gas or, as herein claimed, steam or steam and flue gas, in the mixture that I can without unduly reducing the temperature of the fuel bed. When, as herein claimed, steam is to be substituted for flue gas in the primary current to control the temperature of the fuel bed it is necessary to add air to the primary current to maintain the temperature. The proportion of free oxygen that is required varies with the temperature, velocity of the draft current, character of the fuel, etc., and no fixed proportion of steam and $CO_2$ to O can be prescribed.

By means of the small positive pressure blower 55 a portion of the primary current in normal operation is diverted from the main stream and drawn up through the preheating chamber 10 in contact with the cold fuel filling the same. The gases of the primary current are heated in passing through the fuel bed by the combustion of a portion of the fuel in the gasifying chamber 9 with the oxygen of the primary current. The stream diverted into the preheating chamber 10 will usually enter the same at a temperature between 1300° and 1500° F. This is sufficient to heat and carbonize the fresh charge in 10, the draft current being, in its turn, cooled. Since this diverted stream passes through a considerable thickness of incandescent coke the reactive constituents of this subdivision of the draft current react to some extent with the carbon of the fuel so that the gas withdrawn from the top of the preheater through the passage 56 is a poor producer gas carrying the uncondensible distillation gases from the raw coal. The gas thus withdrawn from the top of the producer is forced by the blower 55 (which is preferably of the positive type) through the passage 57 into the lower part of the cooler 11 of the producer. It ascends through the fuel mass occupying 11 and cools it. The fuel discharges from the chamber 9 into 11 at a temperature around 1500° F. This is sufficient to cause the remaining $CO_2$ and moisture of the gas current ascending through 11 to react with a portion of the glowing coke to form CO, and H also when water vapor is present, subjecting the mass of the coke and ash to a cooling action which may extend down to 1300° or thereabouts. The cooling of the fuel mass below this temperature is accomplished by the abstraction of heat therefrom by the initially cold gas stream. In other words, there is an interchange of heat between the fuel and gas, the fuel being cooled down nearly to atmospheric temperature by the time it reaches the lower part of the cooler while the gas is heated nearly to the temperature of the fuel in the gasifying zone 9 by the time that it reaches it. Passing through the gasifying zone, the conversion of this sub-current into the producer gas is completed. The volume of gas drawn off through 56 and introduced at the bottom of the cooler should be only that required to cool the fuel.

Under some circumstances it may be more convenient to substitute cold stack gases for the cool gas drawn off from the preheating chamber 10. It is to be understood, however, such modification of my invention is intended to be covered by my claims as well as the preferred form. When this modification of the method of operation is preferred, valves 64 and 60 are closed and valve 67 on the connection 68 from the flue gas pipe 66 to the suction pipe 56 of blower 55 is opened. Relatively cool flue gas will now be drawn down from the recuperator stacks and forced through the pipe 57 into the lower part of cooler 11, quenching the unburned fuel in the material in 11, and cooling the said fuel and the ash residue from the fuel burned in chamber 9 down to somewhere near the temperature at which the flue gas is introduced into 11.

When flue gas is used to cool the material in 11 as described above the circulation of gas through 10 to preheat the fuel is effected by the blower 65. The valve 64 being closed the cooled gas from 10 passes from 56 through the pipe 62 (valve 50 being opened) and is forced by the blower 65 either through the pipe 59 into the main current of producer gas flowing through the heat interchanger, or else (valve 74 being shut and valve 83 open) through the branch 82 of 59 to a holder, or any place desired.

During the carbonization of the raw fuel of the charge in the lower part of the preheater 10 volatile matters of the same are given off and condense again in the portion of the fuel mass higher up. The condensed liquid is absorbed by the coke of the charge and carried down in the fragments of the coke into the hotter part of the producer where the heat is sufficient to crack tarry liquids carried down into permanent gas and free carbon as the vaporized liquids are driven off from the coke. The permanent gases thus formed mingle with the gases passing though the preheater and are therefore drawn off through 56, while the liberated carbon is deposited in the pores of the coke, imparting to the same a greater hardness and density than it would otherwise have. In passing through the chamber 9 in contact with the hot coke, the hydrocarbon gases originally formed are still further cracked, forming ultimately chiefly methane and hydrogen. These constituents add considerably to the calorific value of the producer gas generated.

It is obvious that all danger of a stoppage of the draft through 10 by the tar condensed therein may be avoided by simply insuring the presence of a sufficient proportion of coke in the charge. Since the coke is introduced into the producer cold and the weight of the coal charged is nearly one-third greater than that of the coke derived from it, it is apparent that it will always be easy to obtain sufficient cool gas to cool the discharging fuel mass. No matter what the speed at which the fuel is passing through the producer, therefore, the residual coke and ash can always be withdrawn below the temperature of ignition of the former, and, in fact, comparatively cool. There is, therefore, no appreciable loss in the thermal economy of the producer through the use of a comparatively large proportion of coke in the charge. On the other hand, there is of course a limit to the speed at which the fuel may be passed through the producer and this speed is that beyond which it is not possible to carry out the thermal operations of the producer owing to an insufficiency of the time of contact between the fuel and gaseous streams.

The frequency with which the producer is "drawn" and charged will, of course, vary with the conditions and the judgment of the operator. I consider that the interval between two successive draws should be so fixed that not less than 18 inches of the charge column may be withdrawn at one operation, although the interval may be made less, if desired.

It is to be noted that the air for the primary current is preheated in the recuperator 58, by that portion of the boiler flue gas going to the stack, before being introduced into the primary draft flues. The air used to support the combustion in the combustion chambers of the boilers may also be preheated in the recuperator 58.

It is to be noted also, that my invention entirely does away with the customary ash bed in the producer. At no time should the free ashes in the fuel mass in the cooler exceed say 30% of the whole. With some fuels a proportion of ash in excess of 10% may cause more or less obstruction to the draft. I prefer to so regulate the speed at which the fuel is circulated that the proportion of ashes will not be above 5%. The ash therefore exercises practically no effect in interfering with the blast and, since the coke is present for the most part in good sized lumps, the draft resistance of the charge in my producer with proper driving may be practically negligible.

I do not limit myself to the exact construction of the producer shown. For instance, the section of either or both the gasifying and preheating chamber might be made elliptical; or the preheating chamber might be made of circular section with an elliptical or rectangular discharge passage to the generating chamber. The essential requirement as to dimensions being simply that the fuel inlet passage to the gas-generating chamber shall have one cross-dimension longer than that of the generating chamber so that the fuel in the latter chamber will form two opposed surfaces having the natural angle of repose of the fuel in the chamber.

I claim:

1. The method of manufacturing gas which comprises, maintaining a body of mixed carbonized and bituminous fuel in regulated proportions in a relatively long conduit, producing combustible gas in an intermediate region of the said conduit by passing laterally through that portion of the fuel body in said intermediate region an oxidizing draft current comprising regulated proportions of water vapor and air, the relative proportions of the said water vapor and air being so regulated with respect to their respective endothermic and exothermic action on the fuel in the said intermediate portion that the said fuel will be maintained at the temperature desired, advancing the said body of fuel through the said region of semi-combustion at a rate greater than the rate of combustion of the said fuel therein, withdrawing a minor portion of the combustible gas formed in the said intermediate region from the said region, contacting the said minor portion of combustible gas with that portion of the said fuel body above the said intermediate region and which is advancing toward the said region, to carbonize the bituminous matter in the said portion of said fuel body, to preheat the said portion of the said fuel body and to cool the said minor portion of combustible gas, contacting with that portion of the said fuel body which has advanced beyond the said region of semi-combustion the said cooled portion of combustible gas to cool the said portion of said fuel body, withdrawing the cooled mixture of carbonized fuel and ash, separating the carbonized fuel from the ash of the said mixture and returning the said carbonized fuel in admixture with a regulated portion of fresh fuel to that part of the said fuel body which is advancing toward the said region of semi-combustion.

2. The method of making combustible gas which comprises maintaining a body of mixed carbonized and bituminous fuel in regulated proportions in a relatively long conduit, the proportion of the said carbonized fuel relative to that of the bituminous fuel being that proportion which will substantially prevent the caking of the said bituminous fuel, maintaining a semi-combustion to produce combustible gas in an intermediate portion of the fuel in said body by passing through the said portion of fuel an oxidizing draft current composed of balanced proportions of endothermically and exothermically reacting constituents, the said draft current comprising a mixture of water vapor and air in regulated proportions, advancing the said body of fuel through the said region of semi-combustion at a rate greater than the rate of combustion in the said region, the rate of advance of the said body relative to the rate of combustion being that which will maintain a major proportion of unconsumed but carbonized fuel and a minor proportion of ash in the material advanced beyond the said region of semi-combustion, withdrawing a minor portion of combustible gas from the said region of semi-combustion, contacting said minor portion of combustible gas with that portion of the said fuel body which is advancing toward the said region of semi-combustion, to carbonize the bituminous fuel in the said fuel body, to preheat the said portion of said fuel body and to cool the said minor portion of combustible gas, contacting with the mixture of carbonized fuel and ash which has advanced beyond the said region of semi-combustion the said cooled minor portion of combustible gas, the volume of the said portion of combustible gas relative to the quantity of the said mixture of fuel and ash being that required to cool the said mixture to the desired degree.

3. The method of manufacturing gas which comprises, maintaining a body of mixed carbonized and bituminous fuel of regulated proportions in a relatively long conduit, maintaining a semi-combustion to produce combustible gas in a portion of the fuel in said body in an intermediate region of the said fuel conduit by passing through the portion of the said fuel in the said intermediate region a balanced draft current comprising regulated proportions of water vapor and air, advancing the said body of fuel through the said region at a rate greater than the rate of combustion of the said fuel therein, the rate of advance of said body relative to the rate of combustion being that which will maintain a major proportion of unconsumed but carbonized fuel and a minor proportion of ash in the material advanced beyond the said intermediate region, the said major portion of carbonized fuel comprising 80 per cent. or more of said material, withdrawing the minor portion of said combustible gas from said intermediate region, contacting said minor portion of combustible gas with that portion of said fuel body which is advancing toward the said intermediate region, to carbonize the bituminous fuel in the said portion of said fuel body, to preheat the said portion of the said fuel body and to cool the said minor portion of combustible gas, contacting the so-cooled minor portion of combustible gas with the mixture of carbonized fuel and ash which has advanced beyond the said intermediate region to cool the said mixture and to reheat the said portion of combustible gas, and returning the so-reheated portion of combustible gas to the main draft current passing through the said intermediate region.

4. The method of manufacturing combustible gas which comprises, maintaining a body of mixed carbonized and bituminous fuel in regulated proportions in a relatively long conduit, the proportion of said carbonized fuel relative to that of the bituminous fuel being that which will substantially prevent the caking of the said bituminous fuel, maintaining a semi-combustion to produce combustible gas of a portion of the fuel in said body in an intermediate region of said fuel conduit, located near the middle of the said conduit, by passing laterally through the ignited fuel and across the said conduit in said intermediate region an oxidizing draft current comprising balanced proportions of endothermically and exothermically reacting constituents, said draft current comprising flue gas, water vapor and air in regulated proportions, the proportions of flue gas and water vapor on the one hand and the air on the other hand being so regulated with reference to the cooling effect on the said ignited fuel of the flue gas and water vapor and the heating effect on the said fuel of the air that the temperature of the said fuel will be maintained at the point desired, advancing the said body of fuel through the said semi-combustion region at a rate greater than the rate of combustion of the said fuel therein, the rate of advance of said body relative to the rate of combustion being that which will maintain a major proportion of unconsumed but carbonized fuel and a minor proportion of ash in the residual material from said combustion, the said major portion of carbonized fuel constituting 80 per cent. or more of the said material, the said fuel body being advanced by withdrawing regulated portions of the said mixture of carbonized fuel and ash from the lower part of the said fuel conduit, withdrawing the major part of the combustible gas in said semi-combustion region from the said conduit, withdrawing the minor portion of said combustible gas from said semi-combustion region, contacting the said minor portion of said combustible gas with that portion of said fuel body in the upper part thereof above the said region of semi-combustion, and which portion of said body is advancing toward the said region, to carbonize the bituminous fuel in the said fuel mixture, to preheat the said mixture and to cool the said minor portion of combustible gas, withdrawing the residual mixture of carbonized fuel and ash from the said semi-combustion region, contacting with the said fuel and ash mixture a relatively cool gaseous fluid, to quench the carbonized fuel in said mixture, to cool the said fuel and to heat the said gaseous fluid, the volume of the said gaseous fluid relative to the quantity of said mixture of fuel and ash being that required to cool the said mixture to the desired degree, the said gaseous fluid comprising said cooled minor portion of combustible gas, conducting the heated gaseous fluid into and mingling the same with the draft current passing through said region of semi-combustion, withdrawing the mixture of cooled carbonized fuel and ash from the said conduit, the said mixture being withdrawn from the lower part of the said fuel body in said conduit, separating the carbonized fuel from the ash of said mixture and returning the carbonized fuel in admixture with a regulated proportion of fresh bituminous fuel to the part of said body which is advancing toward the said region of semi-combustion, the said part of said fuel body occupying the upper part of the said fuel conduit.

5. In the manufacture of combustible gas the process which comprises, transmitting a body of fuel past and in contact with an oxidizing draft current comprising air and steam in admixture whereby a portion of the fuel of said fuel body is caused to react with reactive constituents of said draft current to generate combustible gas, said fuel being transmitted past said draft current at a rate materially greater than the rate of combustion of said fuel by said draft current and withdrawing in contact with the fuel in that portion of said fuel body which has not been subjected to combustion a portion of the combustible gas formed to cool said portion of combustible gas, and passing cooled combustible gas in contact with that portion of said fuel body which has been subjected to partial combustion by said draft current, to cool said portion of said fuel body.

6. In the manufacture of combustible gas the process which comprises, transmitting an ignited body of fuel past and in contact with an oxidizing draft current comprising air and steam to form combustible gas with a portion of the fuel of said fuel body, said fuel being transmitted therepast at a rate materially greater than the rate of combustion of said fuel by said draft current and withdrawing in contact with the fuel in that portion of said fuel body which has not been subjected to combustion by said draft current a portion of the combustible gas formed to cool said portion of combustible gas, and passing cooled combustible gas in contact with that portion of said fuel body which has been subjected to partial combustion by said draft current, to cool said portion of said fuel body, the volume of said portion of cooled combustible gas being regulated to that required to cool the said material down to the desired temperature.

7. In the manufacture of combustible gas the process which comprises, transmitting a body of fuel past and in contact with an oxidizing current comprising steam and air to form combustible gas with a portion of the fuel of said fuel body, said fuel being transmitted therepast at a rate materially greater than the rate of combustion of said fuel by said draft current and withdrawing in contact with the fuel in that portion of said fuel body which has not been subjected to combustion by said draft current a portion of the combustible gas formed to cool said portion of combustible gas, passing the so-cooled combustible gas in contact with that portion of said fuel body which has been subjected to partial combustion by said draft current, to cool said portion of said fuel body and to re-heat the said portion of combustible gas, returning the re-heated combustible gas to the main current of combustible gas, and withdrawing the said main current from contact with said fuel body.

8. In the manufacture of combustible gas the process which comprises, transmitting a body of fuel past and in contact with an oxidizing draft current comprising steam and air to form combustible gas with a portion of the fuel of said fuel body, said fuel being transmitted therepast at a rate materially greater than the rate of combustion of said fuel by said draft current and withdrawing in contact with the fuel in that portion of said fuel body which has not been subjected to combustion by said draft current a portion of the combustible gas formed to cool said portion of combustible gas, passing cooled combustible gas in contact with that portion of said fuel body which has been subjected to partial combustion by said draft current, to cool said portion of said fuel body, withdrawing the said cooled portion of said fuel body, separating the comparatively coarse portion of said material from the relatively fine portion of the same and returning the said coarse portion to said fuel body in admixture with a regulated proportion of fresh fuel.

9. In the manufacture of combustible gas the process which comprises, transmitting a body of fuel past and in contact with an oxidizing draft current comprising steam and air to form combustible gas with a portion of said fuel body, said fuel being transmitted therepast at a rate such that unconsumed fuel shall constitute the major portion of the said fuel body after the same has been transmitted past said draft current and withdrawing in contact with the fuel in that portion of said fuel body which has not been subjected to combustion by said draft current a portion of the combustible gas formed to cool said portion of combustible gas, and passing cooled combustible gas in contact with that portion of said fuel body which has been subjected to partial combustion by said draft current, to cool said portion of said fuel body.

10. In the manufacture of combustible gas the process which comprises, transmitting a body of fuel past and in contact with an oxidizing draft current comprising steam and air to form combustible gas with a portion of said fuel body, said fuel being transmitted therepast at a rate such that unconsumed but carbonized fuel shall constitute the major portion of the said fuel body after the same has been transmitted past said draft current and withdrawing in contact with the fuel in that portion of said fuel body which has not been subjected to combustion by said draft current a portion of the combustible gas formed to cool said portion of combustible gas, passing cooled combustible gas in contact with that portion of said fuel body which has been subjected to partial combustion by said draft current, to cool said portion of said fuel body, separating the unconsumed fuel in the said cooled portion of said fuel body from the ash in the same and returning the said unburned portion to said fuel body in admixture with a regulated proportion of fresh fuel.

11. In the manufacture of combustible gas the process which comprises, transmitting a body of fuel past and in contact with an oxidizing draft current comprising steam and air to form combustible gas with a portion of said fuel body, said fuel being transmitted therepast at a rate such that unconsumed but carbonized fuel shall constitute 70 per cent. or more of said fuel body after the same has been transmitted past said draft current and withdrawing in contact with the fuel in that portion of said fuel body which has not been subjected to combustion by said draft current a portion of the combustible gas formed to cool said portion of combustible gas, and passing cooled combustible gas in contact with that portion of said fuel body which has been subjected to partial combustion by said draft current, to cool said portion of said fuel body.

12. In the manufacture of combustible gas the process which comprises, transmitting a body of fuel past and in contact with an oxidizing draft current comprising steam and air to form combustible gas with a portion of said fuel body, said fuel being transmitted therepast at a rate such that unconsumed fuel shall constitute 70 per cent. or more of said fuel body after the same has been transmitted past said draft current and withdrawing in contact with the fuel in that portion of said fuel body which has not been subjected to combustion by said draft current a portion of the combustible gas formed to cool said portion of combustible gas, passing cooled combustible gas in contact with that portion of said fuel body which has been subjected to partial combustion by said draft current, to cool said portion of said fuel body, separating the unconsumed fuel in the said cooled portion of said fuel body from the ash in the same and returning the said unburned portion of said fuel body in admixture with a regulated proportion of fresh fuel.

13. In the manufacture of combustible gas the process which comprises, transmitting a body of fuel past and in contact with an oxidizing draft current comprising steam and air to form combustible gas with a portion of said fuel body, said fuel being transmitted therepast at a rate such that unconsumed fuel shall constitute the major portion of the said fuel body after the same has been transmitted past said draft current and withdrawing in contact with the fuel in that portion of said fuel body which has not been subjected to combustion by said draft current a portion of the combustible gas formed to cool said portion of combustible gas, passing cooled combustible gas in contact with that portion of said fuel body which has been subjected to partial combustion by said draft current, to cool said portion of said fuel body, separating the unconsumed fuel in the said cooled portion of said fuel body from the ash in the same and returning the said unburned portion of said fuel body in admixture with a regulated proportion of fresh fuel, the proportion of the returned fuel in said mixture being that which will reduce the caking of the fresh fuel to the desired degree.

14. In the manufacture of combustible gas the process which comprises, transmitting a body comprising fresh and carbonized fuel in admixture past and in contact with an oxidizing draft current comprising steam and air, said draft current being of such nature and in such volume as to form combustible gas with a portion of said fuel body, said fuel being transmitted therepast at a rate such that unconsumed fuel shall constitute 70 per cent. or more of said fuel body after the same has been transmitted past said draft current and withdrawing in contact with the fuel in that portion of said fuel body which has not been subjected to combustion by said draft current a portion of the combustible gas formed to cool said portion of combustible gas, and passing cooled combustible gas in contact with that portion of said fuel body which has been subjected to partial combustion by said draft current, to cool said portion of said fuel body.

15. The process of making combustible gas which comprises, maintaining a body of fuel in a relatively long body or mass, maintaining a semi-combustion in an intermediate combustion region of said fuel body or mass by passing through the fuel body in said region an oxidizing draft current comprising steam and air, advancing the said fuel body through said combustion region at a rate such that the portion of said body that has been advanced beyond said combustion region shall consist in major part of unburned but carbonized fuel, withdrawing a portion of the gases of semi-combustion generated in the said combustion region from the same, contacting the said portion of said gases with the portion of said fuel body advancing toward said combustion region, to cool said portion of gases and to preheat the said portion of said fuel body, contacting the said portion of cooled gases with the portion of the said fuel body that has advanced beyond said combustion region to quench and to cool the material of said portion of said fuel body, withdrawing the cooled material from said fuel body, separating the unburned fuel from the ash of said material, mixing the said unburned fuel with a regulated portion of fresh fuel and adding the fuel mixture to that portion of said fuel body which is advancing toward said combustion region.

16. The process of making combustible gas which comprises, maintaining a body of fuel in a relatively long body or mass, maintaining a semi-combustion in an intermediate combustion region of said fuel body or mass by passing through the fuel body in said region an oxidizing draft current comprising steam and air, advancing the said fuel body through said combustion region at a rate such that the portion of said body that has been advanced beyond said combustion region shall consist in major part of unburned but carbonized fuel, withdrawing a portion of the gases of semi-combustion generated in the said combustion region from the same, contacting the said portion of said gases with the portion of said fuel body advancing toward said combustion region, to cool said portion of gases and to preheat the said portion of said fuel body, contacting the said portion of cooled gases with the portion of the said fuel body that has advanced beyond said combustion region to quench and to cool the material of said portion of said fuel body, the volume of the portion of said gases of semi-combustion withdrawn and cooled being that required to cool to the desired degree the said portion of said fuel body, withdrawing the cooled material from said fuel body, separating the unburned fuel from the ash of said material, mixing the said unburned fuel with a regulated portion of fresh fuel and adding the fuel mixture to that portion of said fuel body which is advancing toward said combustion region.

17. The process of operating a gas-producer which comprises, passing the main draft current of the gas-producer comprising steam and air across the fuel bed of the same, withdrawing a portion of the gas of the main draft current and passing said portion of gas in contact with a fresh portion of fuel intended to be consumed in said producer before the said portion of fuel has entered a gas-making region of said producer, to cool the said portion of gas and to preheat the said portion of fuel, withdrawing unconsumed but carbonized fuel and ash from the gas-making region of said gas-producer, and passing the so-cooled portion of the gas in contact with the hot residual fuel and ash withdrawn from the gas-making region of said producer.

18. The process of operating a gas-producer which comprises, passing the main draft current of the gas-producer comprising steam and air across the fuel bed of the same, withdrawing a portion of the gas of the main draft current and passing said portion of gas in contact with a fresh portion of fuel intended to be consumed in said producer before the said portion of fuel has entered the gas-making region of the said producer, to cool the said portion of gas and to preheat the said portion of fuel, passing the fuel mass through said producer at a rate materially greater than that at which the reactive constituents of the said draft current react with said fuel, withdrawing unconsumed but carbonized fuel and ash from the gas-making region of said gas-producer, and passing the said cooled portion of gas in contact with the said unconsumed fuel and ash withdrawn from said gas-making region.

19. The process of operating a gas-producer which comprises, passing the main draft current of the gas-producer comprising steam and air across the fuel bed of the same, withdrawing a portion of the main draft current and passing said portion of said draft current in contact with a portion of fuel intended to be consumed in a gas producer before the said portion has entered the gas-making region of the said producer, to preheat the said portion of fuel, passing the fuel mass in said gas-producer through said main draft current at a rate greater than that at which the reactive constituents of the said draft current react with said fuel, withdrawing the residual portion of said fuel mass from contact with said main draft current, passing cooled gaseous fluid in contact with the said residual portion of said fuel to cool the said residue and to heat the said portion of gaseous fluid, and passing the reheated gaseous fluid in contact with the fuel which is in contact with the said main draft current whereby the said gaseous fluid is added to the said draft current.

20. The process of operating a gas-producer which comprises, passing the main draft current of the gas-producer comprising steam and air across the fuel bed of the same, withdrawing a portion of the main draft current of the producer and passing said portion in contact with a fresh portion of fuel intended to be consumed in said gas-producer before said portion of fuel gas entered the gas-making region of the said gas-producer, to preheat the said portion of fuel and to cool said portion of said draft current, passing the fuel column of said gas-producer through the gas-producing region of the same at a rate such that the mixture of fuel and ash discharging from the said region will contain a major portion of unconsumed but carbonized fuel, withdrawing said mixture of carbonized fuel and ash, passing the said cooled portion of the said draft current in contact with the said mixture of fuel and ash, to quench the ignited fuel of said mixture, to cool the said mixture and to reheat the said portion of said draft current, and passing the reheated portion of said draft current into the gas-making region of said producer to rejoin the main draft current of the same.

21. The process of operating a gas-producer which comprises, passing the main draft current of the gas-producer comprising steam and air across the fuel bed of said producer, withdrawing a portion of the said main draft current of the producer and passing the said portion in contact with a portion of fuel intended to be consumed in said gas-producer before the said fuel has entered the gas-making region of the same, to cool the said portion of gas and to preheat the said portion of fuel, passing said preheated fuel through the gas-making region of said producer at a rate such that the mixture of fuel and ash discharging from the said region will contain 70 per cent. or more of unconsumed but carbonized fuel, withdrawing said mixture of carbonized fuel and ash from said gas-making region, passing the said cooled portion of said draft current in contact with the said mixture, to quench the ignited fuel of said mixture, to cool the said mixture and to reheat the said portion of said draft current, and passing the reheated draft current into the gas-making region of the producer to rejoin the main draft current.

22. The method of manufacturing gas which comprises, maintaining a body of fuel in a relatively long body or mass, maintaining a semi-combustion to produce combustible gas in a portion of the fuel in the said body in an intermediate region of said body located near the middle of said body or mass by passing laterally through the ignited fuel and across the said body or mass an oxidizing draft current comprising balanced proportions of steam and air, advancing the said body of fuel through said region of semi-combustion at a rate greater than the rate of combustion of said fuel therein, the rate of advance of said body relative to the rate of combustion being that which will maintain a major proportion of unconsumed but carbonized fuel and a minor proportion of ash in the residual material from said combustion, withdrawing said residual material from the said region of semi-combustion, and contacting with the said residual mixture of fuel and ash a current of gaseous fluid, the volume of the said gaseous fluid relative to the quantity of said mixture of fuel and ash being that required to cool the said mixture to the desired degree.

23. The method of manufacturing gas which comprises, maintaining a body initially composed of mixed carbonized and bituminous fuel in regulated proportions in a relatively long body or mass, maintaining a semi-combustion to produce combustible gas in an intermediate portion of the said fuel body located near the middle of the said body or mass by passing through said intermediate region a draft current comprising balanced proportions of steam and air, advancing the said fuel body through said region of semi-combustion at a rate greater than the rate of combustion therein, contacting with that portion of the said fuel body which has advanced beyond the said region of semi-combustion a relatively cool gaseous fluid to quench the carbonized fuel in said mixture and to cool the said fuel and ash, withdrawing the cooled mixture of carbonized fuel and ash from said conduit, separating the carbonized fuel from the ash of the said mixture and returning the said carbonized fuel with a regulated proportion of fresh fuel to the upper part of said fuel body.

24. The method of manufacturing combustible gas which comprises, maintaining a body of mixed carbonized and bituminous fuel in regulated proportions in a relatively long body or mass, maintaining a semi-combustion to produce combustible gas in an intermediate region of the said fuel body or mass by passing through the fuel body in said intermediate region an oxidizing draft current, said draft current comprising steam, flue gas and air in regulated proportions, the proportion of the said steam and flue gas to the air in said draft current being regulated with reference to their respective endothermic and exothermic action on the said fuel to maintain the said fuel at the temperature desired, advancing the said fuel body of fuel through the said region of semi-combustion at a rate greater than the rate of combustion of the said fuel therein, withdrawing a major portion of the combustible gas formed in said intermediate region from the said conduit, withdrawing a minor portion of the said combustible gas from said region, contacting the said minor portion of the said combustible gas with that portion of the said fuel body in the upper part of said conduit above the said region of semi-combustion, to carbonize the bituminous fuel in the said fuel body, to preheat the fuel body and to cool the said minor portion of combustible gas, withdrawing the unconsumed fuel and ash from the said region of semi-combustion, and cooling the said mixture of fuel and ash by contacting therewith a relatively cool gaseous fluid.

25. The method of manufacturing gas which comprises, maintaining a body of mixed carbonized and bituminous fuel in regulated proportions in a relatively long body or mass, maintaining a semi-combustion to produce combustible gas in a portion of the fuel in said body in an intermediate region of the said body or mass by passing through the said fuel in the said intermediate region an oxidizing draft current comprising steam, flue gas and air in regulated proportions, advancing the said body of fuel through the said combustion region at a rate greater than the rate of combustion of the said fuel therein, withdrawing the major portion of the combustible gas formed in the said intermediate region from the said conduit, withdrawing the minor portion of the said combustible gas from the said region, contacting the said minor portion of the said combustible gas with that portion of said fuel body in the upper part thereof above the said region of semi-combustion, to carbonize the bituminous fuel in said portion of said fuel body, to preheat the said fuel body and to cool the said minor portion of combustible gas, conducting the so-cooled combustible gas to the lower portion of said fuel body and contacting the said gas with the mixture of unburned fuel and ash withdrawn from the said intermediate region to cool the said mixture and to reheat the said combustible gas, and mingling the so-heated combustible gas with the main body of combustible gas.

26. The method of making gas which comprises, maintaining a body of fuel in a relatively long body or mass, said fuel comprising mixed carbonized and bituminous fuel, maintaining a regulated combustion in an intermediate region of the said fuel body by passing through the fuel in said intermediate region a draft current comprising balanced proportions of air and steam, the proportions of the said constituents of the said draft current being so regulated with respect to their exothermic and endothermic action on the fuel in the said intermediate region as to maintain the fuel body therein at the desired temperature, withdrawing a minor portion of combustible gas produced in said intermediate region, contacting the said minor portion of combustible gas with that portion of said fuel body which is advancing toward the said intermediate region, to carbonize the bituminous fuel in the said fuel body, to preheat the said body of fuel and to cool the said minor portion of combustible gas, contacting with the portion of the fuel body which has advanced beyond the said intermediate region the said cooled minor portion of combustible gas, to cool the said portion of the fuel body and to reheat the said minor portion of combustible gas, and returning the so-reheated minor portion of combustible gas to the said intermediate region of the said body or mass to join the main draft current passing therethrough.

27. The method of manufacturing gas which comprises, maintaining a body of mixed carbonized and bituminous fuel in regulated proportions in a relatively long body or mass, maintaining a semi-combustion in an intermediate region of the said fuel body by passing through the fuel in the said intermediate region an oxidizing draft current comprising steam and air, advancing the said body of fuel through the said region of semi-combustion at a rate greater than the rate of combustion of the said fuel therein, the rate of advance of the said body relative to the rate of combustion in the said intermediate region being that which will maintain a major proportion of unconsumed but carbonized fuel and a minor proportion of ash in the material that has passed through the said intermediate region, withdrawing a minor portion of the combustible gas made in the said intermediate region, contacting the said minor portion of combustible gas with that portion of the said fuel body which is advancing toward the said region of semi-combustion, to carbonize the bituminous fuel in the said portion of the said fuel body, to preheat the said portion of said fuel body and to cool the said minor portion of combustible gas, cooling the mixture of carbonized fuel and ash which has advanced beyond the said region of semi-combustion by contacting therewith the said cooled portion of combustible gas, withdrawing the cooled mixture of carbonized fuel and ash from the said body or mass, separating the carbonized fuel from the ash of said mixture and returning the said carbonized fuel in admixture with a regulated proportion of fresh bituminous fuel to the upper part of said fuel body.

28. The method of making combustible gas which comprises, maintaining a body of mixed carbonized and bituminous fuel in regulated proportions in a relatively long body or mass, maintaining a semi-combustion to produce combustible gas in a portion of the fuel in said body in an intermediate region of the said body or mass by passing through the said fuel body in said intermediate region an oxidizing draft current comprising balanced proportions of steam and air, advancing the said body of fuel through the said intermediate region at a rate greater than the rate of combustion in the said region, the rate of advance of the said body relative to the rate of combustion being that which will maintain a major proportion of carbonized fuel and a minor proportion of ash in the residuum material from the said combustion, withdrawing the minor portion of the combustible gas formed in said intermediate region and passing the same in contact with that portion of the said fuel body which is advancing toward the said intermediate region, to carbonize the bituminous matter in said portion of said fuel body, to heat the said portion of the said fuel body and to cool the said minor portion of combustible gas, contacting with the mixture of carbonized fuel and ash which has advanced beyond the said intermediate region a current of gaseous fluid, the volume of the said gaseous fluid relative to the quantity of the said mixture of fuel and ash being that required to cool the said mixture to the desired degree.

29. The method of manufacturing combustible gas which comprises, maintaining a body of mixed carbonized and bituminous fuel in regulated proportions in a relatively long body or mass, maintaining a semi-combustion to produce combustible gas in an intermediate region of the said fuel conduit by passing laterally through the fuel in the said intermediate region an oxidizing draft current, the said draft current comprising balanced proportions of steam and air, advancing the said body of fuel through the said region of semi-combustion at a rate greater than the rate of combustion of the fuel therein, the rate of advance of said fuel relative to the rate of combustion being that which will maintain a major proportion of unconsumed but carbonized fuel and a minor proportion of ash in the material advanced beyond the said region of semi-combustion, withdrawing a minor portion of the combustible gas from the said region of semi-combustion, contacting the said minor portion of combustible gas with that portion of said fuel body which is advancing toward the said region of semi-combustion, to carbonize the bituminous matter in the said portion of said fuel body, to preheat the said portion of said fuel body and to cool the said minor portion of combustible gas, contacting the so-cooled combustible gas with the mixture of fuel and ash advanced beyond the said region of semi-combustion to cool said mixture and to reheat the said minor portion of combustible gas, and mingling the reheated minor portion of combustible gas with the main draft current passing through the said region of semi-combustion.

30. The method of making combustible gas which comprises, maintaining a body of fuel in a relatively long body or mass, maintaining a semi-combustion to produce combustible gas in a portion of the fuel of the said body in an intermediate region of the said fuel body or mass by passing laterally through the ignited fuel and across the said body or mass in the said intermediate region an oxidizing draft current comprising balanced proportions of steam and air, advancing the said body of fuel through the said region of semi-combustion at a rate greater than the rate of combustion of the fuel in said region, the rate of advance of said body relative to the rate of combustion being that which will maintain a major proportion of unconsumed but carbonized fuel and a minor proportion of ash in the material advanced beyond the said region of semi-combustion, the said fuel body being advanced by withdrawing regulated portions of the same from the lower part of the said body or mass, withdrawing a minor portion of the combustible gas from the said intermediate region, contacting the said minor portion of combustible gas with that portion of the said fuel body which is advancing toward the said region of semi-combustion, to carbonize the bituminous fuel in the said portion of said fuel body, to preheat the said portion of said fuel body and to cool the said minor portion of combustible gas, contacting with the said mixture of carbonized fuel and ash which has advanced beyond the said region of semi-combustion a relatively cool gaseous fluid, to quench the carbonized fuel in the said mixture, to cool the said fuel and ash and to heat the said gaseous fluid, conducting the so-heated gaseous fluid into the said region of semi-combustion and mingling the said fluid with the draft current passing through the said region, withdrawing the cooled mixture of carbonized fuel and ash from the said conduit, separating the carbonized fuel from the ash of the said mixture and returning the said carbonized fuel in admixture with a regulated proportion of fresh bituminous fuel to that part of the said fuel body which is advancing toward the said region of semi-combustion.

31. The method of manufacturing combustible gas which comprises, maintaining a body of fuel in a relatively long body or mass, maintaining a semi-combustion to produce combustible gas of a portion of the fuel in said body in an intermediate region of the said fuel body or mass by passing therethrough an oxidizing draft current comprising balanced proportions of steam, flue gas and air, the proportion of steam and flue gas on the one hand and air on the other hand being so regulated with reference to the cooling effect on the ignited fuel in the said intermediate region of the steam and flue gas and the heating effect of the air that the temperature of the fuel in the said intermediate region will be maintained at the point desired, advancing the said body of fuel through the said region of semi-combustion by withdrawing regulated portions of the material advanced beyond the said region of semi-combustion from the lower part of the said fuel body or mass, withdrawing a minor portion of the combustible gas formed in the said region of semi-combustion, contacting the said minor portion of combustible gas with that portion of the said fuel body which is advancing toward the said region of semi-combustion, contacting with that portion of the said fuel body which has advanced beyond the said region of semi-combustion a relatively cool gaseous fluid, to quench the carbonized fuel in the said portion of said fuel body, to cool the said portion of said fuel body and to heat the said gaseous fluid, the volume of the said gaseous fluid relative to the said portion of the said fuel body being that required to cool the material of the said portion of the said fuel body to the desired degree, and conducting the so-heated gaseous fluid into the said region of semi-combustion and mingling the said fluid with the draft current passing through the said region.

Signed at New York city, in the county of New York and State of New York, this 28th day of January, A. D. 1915.

HENRY L. DOHERTY.

Witnesses:
 THOS. I. CARTER,
 WILLIAM DUYERS.